United States Patent Office 3,072,387
Patented Jan. 8, 1963

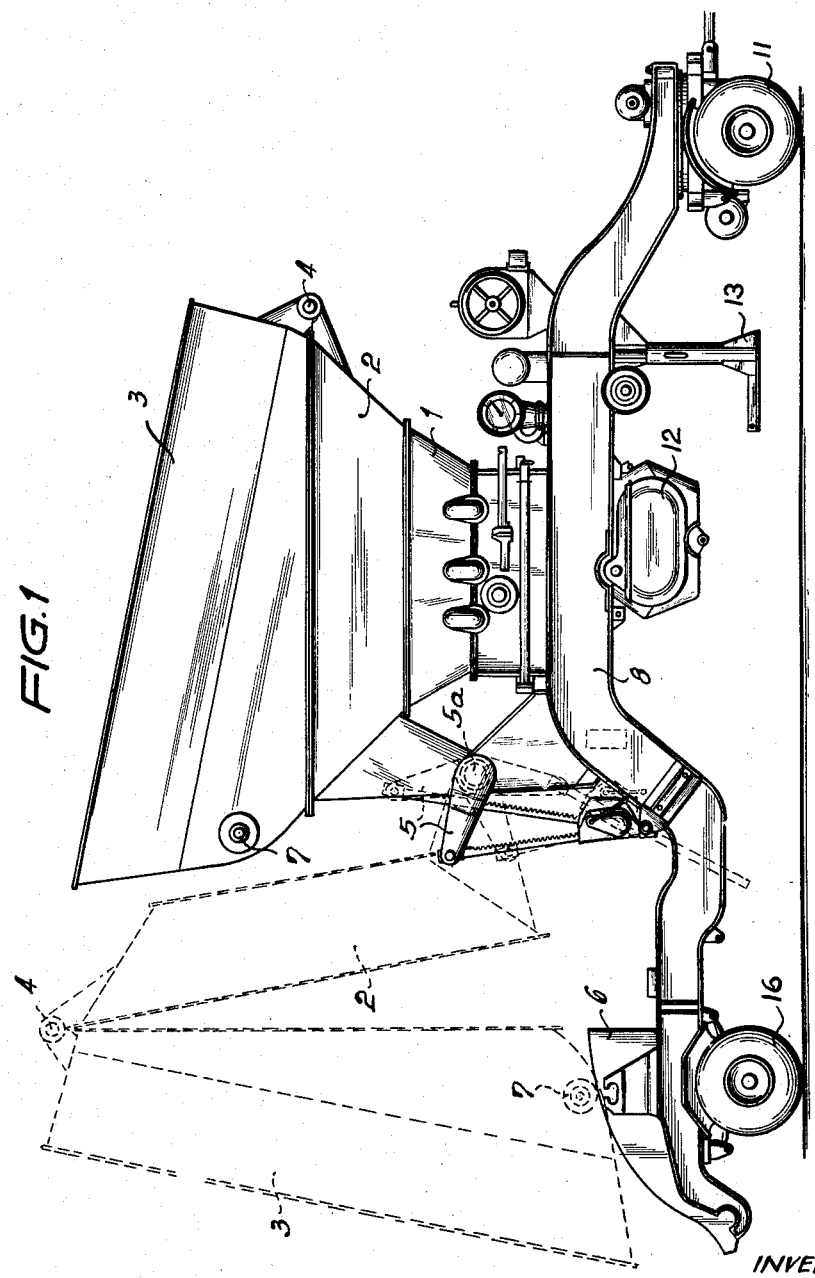

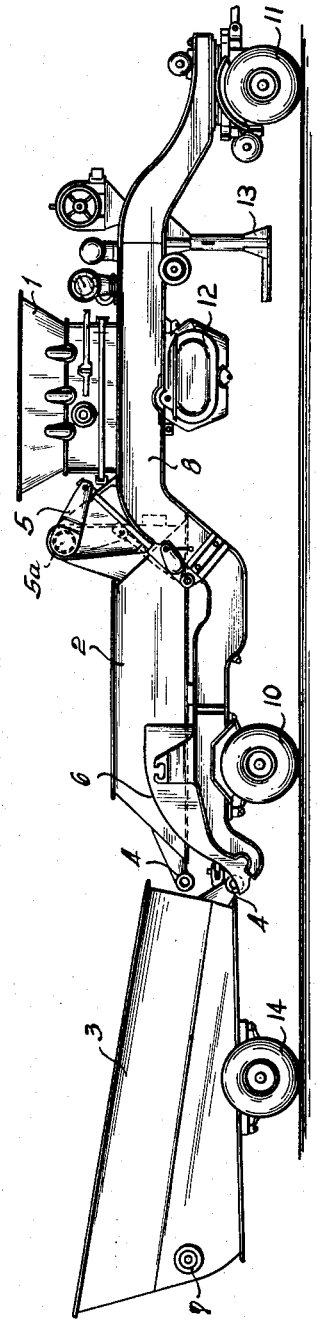

3,072,387
MOBILE MIXING MACHINE
Carl H. Heise, 12 Kahlandstrasse,
Alfeld (Leine), Germany
Filed Nov. 29, 1960, Ser. No. 72,372
Claims priority, application Germany Mar. 25, 1960
6 Claims. (Cl. 259—150)

The present invention relates to a mobile sieving and mixing machine as used for processing building materials.

More in particular the present invention relates to a sieving and mixing machine for processing building materials such as, particularly, bituminous road-building materials of very high output.

It is known in the art to provide sieving and mixing machines for processing and loading building materials such as, particularly, bituminous road-building materials. Such machines comprise a mobile machine frame on which there is provided, among others, a mixer and a mixing tower.

The general tendency is to require an increase of the dimensions of such machines and particularly of the mixing tower, as machines of greater processing capacity and higher output are generally desired. At the same time, it is desirable to make such machines susceptible to transportation on the road to enable easy and quick movement of the machine from one work site to another. The generally increasing size of the machines and especially the mixing tower is, however, limited by existent traffic regulations, the overall size and particularly the height being generally limited to a much smaller value than the desired size and height of machines with great output. In addition to traffic regulations the clearance of most bridges is far smaller than would be required by the desired height of such machines and especially the mixing tower.

With the foregoing in mind it is the general object of the present invention to provide an improved sieving and mixing machine for processing building materials such as bituminous road-building materials.

It is a particular object of the present invention to provide a machine of the aforementioned type which has a greatly increased processing capacity, while, at the same time, being susceptible to road- and railroad-transportation without exceeding the prescribed road and railroad dimensions and without rendering transportation of the machine unduly obstructive and complicated.

The aforementioned objects of the invention are achieved by the sieving and mixing machine comprising a mixing tower of high processing capacity which is capable of assuming a work position and a transport position, and which machine comprises means for easily effecting the transfer from one position into the other. According to the invention the mixing tower has a composite structure in its work position, consisting of three different portions, the lowermost of which is fixedly attached to the machine frame immediately above the mixer, whereas the central and uppermost portions rest upon the lowermost portion in the work position, but can be lifted off the latter and moved to the transport position by means of manually, electrically or hydraulically operated winches. The central and uppermost portions are connected with each other by detachable hinge means.

Upon operating the winches the central and upper portions are first slightly lifted off the lowermost portion and are then tilted by 90° counter-clockwise. Thereafter, the two portions are gradually lowered and further tilted, the central portion by further 90°, until it is placed on the machine frame substantially juxtaposedly relative to the lowermost portion and the mixer, whereas the uppermost portion is also further lowered, but tilted by 90° in the opposite direction, whereupon it can be attached to the machine frame as a trailer after having it disconnected from the central portion. A pair of trailing wheels is placed under the uppermost portion thus attached, thereby converting it to a trailer.

In order to facilitate the gradual lowering of the central and upper portions, the machine frame can be provided with a downwardly inclined guide member upon which travel one or several guide rollers with which the uppermost portion can be provided.

The invention will be better understood upon the following description of the accompanying drawings, wherein FIGURE 1 is a side elevational view of the sieving and mixing machine of the invention, showing the mixing tower in its working position;

FIGURE 2 is a side elevational view of the machine of the invention, illustrating the machine in its transport position in which some parts of the composite mixing tower have been moved into the transport position.

Referring now to the drawings more in detail, the machine of the invention comprises a mobile machine frame 8 having two pairs of wheels 10 and 11, allowing for trailing transport of the machine, for example by a truck or tractor. The machine frame also has a sturdy support 13 which can be lowered from the position shown in the drawings to the ground, thereby assuring a firm and stable support of the machine in its working position.

In its central portion the machine frame supports a mixer 12 above which there is disposed the tower. According to the invention the mixing tower has a composite structure and consists of three different portions 1, 2 and 3 which can be stacked upon one another to form the mixing tower in its working position, as shown in FIGURE 1, but which can also be removed from one another, as illustrated in FIGURE 2, in order to assume the transport position.

The lowermost portion 1 of the mixing tower is disposed immediately above mixer 12 and in fixed connection with machine frame 8. According to the invention, the mixing tower further comprises a central portion 2 disposed above lower portion 1 and an upper portion 3. Portions 2 and 3 rest upon lower portion 1 in the working position illustrated in FIGURE 1, but are not fixedly attached to the latter so that they can be lifted off the same. Portions 2 and 3 are connected with each other by means of a detachable hinge 4, such as, for example, a bolt connection. The central portion 2 is operatively connected with a pair of winches 5 and 5a, which can be manually operated winches, as illustrated in the drawings, but can, however, also be electrically or hydraulically operated.

By means of these winches 5 and 5a portions 2 and 3 can be lifted off portion 1 so as to be moved from the working position, shown in FIGURE 1, to the transport position, illustrated in FIGURE 2. The displacement is effected as follows: Upon operating winches 5 and 5a, portions 2 and 3 are first moved into the position illustrated by the dashed lines in FIGURE 1, that is, they are slightly lifted off portion 1 and then tilted by 90° in counter-clockwise direction. Upon further operating winches 5 and 5a the portions 2 and 3 are thereupon lowered. In order to facilitate this lowering operation, machine frame 8 can be provided at the respective end with a guide portion 6, being downwardly curved, and with which cooperate one or several guide rollers 7, provided on portion 3. When portion 3 is lowered, rollers 7 travel along the downwardly curved guide member 6, thereby giving a better support and stability to both portions 2 and 3. As soon as the lower side of portion 3 has reached the ground, the hinge connection 4 is opened and portion 3 is thus released from connection with portion 2. Portion 3 can then be placed on a pair of trailing wheels 14 and attached to the rear end of machine frame 8 by suitable attachment means, so as to become a trailer of machine frame 8. Portion 3 has thus been tilted from the position illustrated by the dashed lines in FIGURE 1 to the transport position illustrated in FIGURE 2 again by 90°, but in the opposite direction, that is in clockwise direction. Portion 2 is then further lowered and continued to be tilted in the same direction as previously until it reaches the position illustrated in FIGURE 2, where it is supported by the machine frame 8 substantially juxtaposedly relative to portion 1 and mixer 12. Portion 2 thus has been tilted by a total of 180° in one and the same direction, that is counter-clockwise.

It will thus be appreciated that, in order to effect travel from the working position into the transport position, portion 2 is tilted in one and the same direction, for example counter-clockwise, by a total of 180°, whereas portion 3 is first tilted by 90° in one direction and then back by 90° in the opposite direction, while simultaneously being gradually lowered and displaced so as to reach the position behind machine frame 8, as shown in FIGURE 2.

For a transfer from the transport position to the working position portion 3 is disconnected from machine frame 8, and the hinge connection 4 with portion 2 is reestablished. Thereafter, the winches 5 and 5a are operated so that portion 2 is gradually lifted, taking along portion 3, until the rollers 7 reach guide member 6, and the two portions 2 and 3 have reached the position illustrated by the dashed lines in FIGURE 1, whereupon the winches are further operated until portion 2 comes to rest upon portion 1, thereby reestablishing the working position of the mixing tower.

It will be easily apparent that the dimensions and particularly the height of the sieving and mixing machine are greatly reduced in the transport position, since the high composite mixing tower has been dismantled. In view of the fact that the mixing tower has an overall height of some fifteen to sixteen meters above the ground, it is apparent that the invention affords the only solution to the transport problem. In most countries of the world traffic regulations prohibit the road transport of trailers having the dimensions of machine frame 8 with the mixing tower in its working position. On the other hand, a mixer tower of the indicated size is required at the work site in order to assure a satisfactory and efficient output of building materials. The invention thus offers the only solution of the transport problem, as the machine in the transport position, as shown in FIGURE 2, is in harmony with the pertinent regulations.

The winch means 5 and 5a can be advantageously chosen to be of the type of the winch means disclosed in my co-pending application Serial Number 14,411, filed March 11, 1960, and reference is made to the disclosure of structure and operation of the winch means made in the specification and the drawings of the above application.

It will be understood that this invention is susceptible to modification in order to adapt it to different usages and conditions and, accordingly, it is desired to comprehend such modifications within this invention as may fall within the scope of the appended claims.

What I claim is:

1. In a mobile mixing machine for processing building materials comprising the combination of a machine frame; wheels supporting said machine frame; a mixer on said machine; a mixing tower disposed above said mixer and having a working position and a transport position; said mixing tower comprising a lower portion immediately above said mixer and fixedly connected with said machine frame, a central portion pivotally connected to said frame and resting in said working position on top of said lower portion, and an upper portion resting in said working position on top of said central portion; detachable hinge means pivotally connecting said upper portion with said central portion, said hinge means being positioned opposite from where said central portion is pivotally connected to said frame; and winch means drivingly connected to said central portion for moving said central portion and asid upper portion from said lower portion into the transport position wherein said upper portion is trailingly connected with one end of said frame and said central portion is directly supported by said frame substantially juxtaposedly relative to said lower portion; said winch means also operable to replace said central portion and said upper portion to said working position above said lower portion so as to form said mixing tower.

2. In a mobile mixing machine according to claim 1, wherein said central portion being pivotable through an angle of 180° in one predetermined sense and gradually lowered by said winch means whenever moved from said working position to said transport position and being pivotable through an angle of 180° in the opposite sense and gradually lifted by said winch means whenever moved from said transport position to said working position.

3. In a mobile mixing machine according to claim 2, wherein said upper portion is first pivoted by 90° in one sense and then gradually lowered and tilted by 90° in the opposite sense by said winch means whenever moved from said working position to said transport position.

4. In a mobile mixing machine according to claim 3, further comprising a guide surface portion on said frame and a guide roller on said upper portion rolling along said guide surface after said upper portion has been tilted by 90° in one sense and while being lowered and tilted in the opposite sense.

5. In a mobile mixing machine, the combination of a frame, a mixing tower on said frame, said mixing tower comprising a lower portion fixedly mounted on said frame, said mixing tower also comprising a central portion positioned on said lower portion when in the working position and having one end pivotally connected to said frame, said mixing tower further comprising an upper portion positioned on said central portion when in the working position and having the opposite end thereof pivotally connected to said central portion, power means on said frame operatively connected to said central portion for pivoting said central portion substantially 180° to its transport position around its frame pivot connection, and means on said frame engageable with said upper portion when both said central portion and said upper portion have been pivoted through an angle of substantially 90° for causing said upper portion to pivot 90° in the other direction as said central portion continues to pivot to its transport position.

6. In a mobile mixing machine for processing building materials comprising the combination of a frame; wheels supporting said frame; a mixer on said machine; a mixing tower disposed above said mixer and having a working position and a transport position; said mixing tower comprising a lower portion immediately above said mixer and fixedly connected with said machine frame, a central portion pivotally connected to said frame and resting in said working position on top of said lower portion, and an upper portion resting in said working position on top of said central portion; detachable hinge means pivotally connecting said upper portion with said central portion, said hinge means being positioned opposite from where said central portion is pivotally connected to said frame; and winch means drivingly connected to said central portion for moving said central portion and said upper portion from said lower portion into the transport position wherein said upper portion is trailingly connected with one end of said frame and said central portion is directly supported by said frame substantially juxtaposedly relative to said lower portion; said winch means also operable to replace said central portion and said upper portion to said working position above said lower portion so as to form said mixing tower.

References Cited in the file of this patent

UNITED STATES PATENTS

| | | |
|---|---|---|
| 2,190,044 | Pollitz | Feb. 13, 1940 |
| 2,805,052 | Freeman | Sept. 3, 1957 |
| 2,945,683 | Martinson | July 19, 1960 |